Patented Sept. 29, 1942

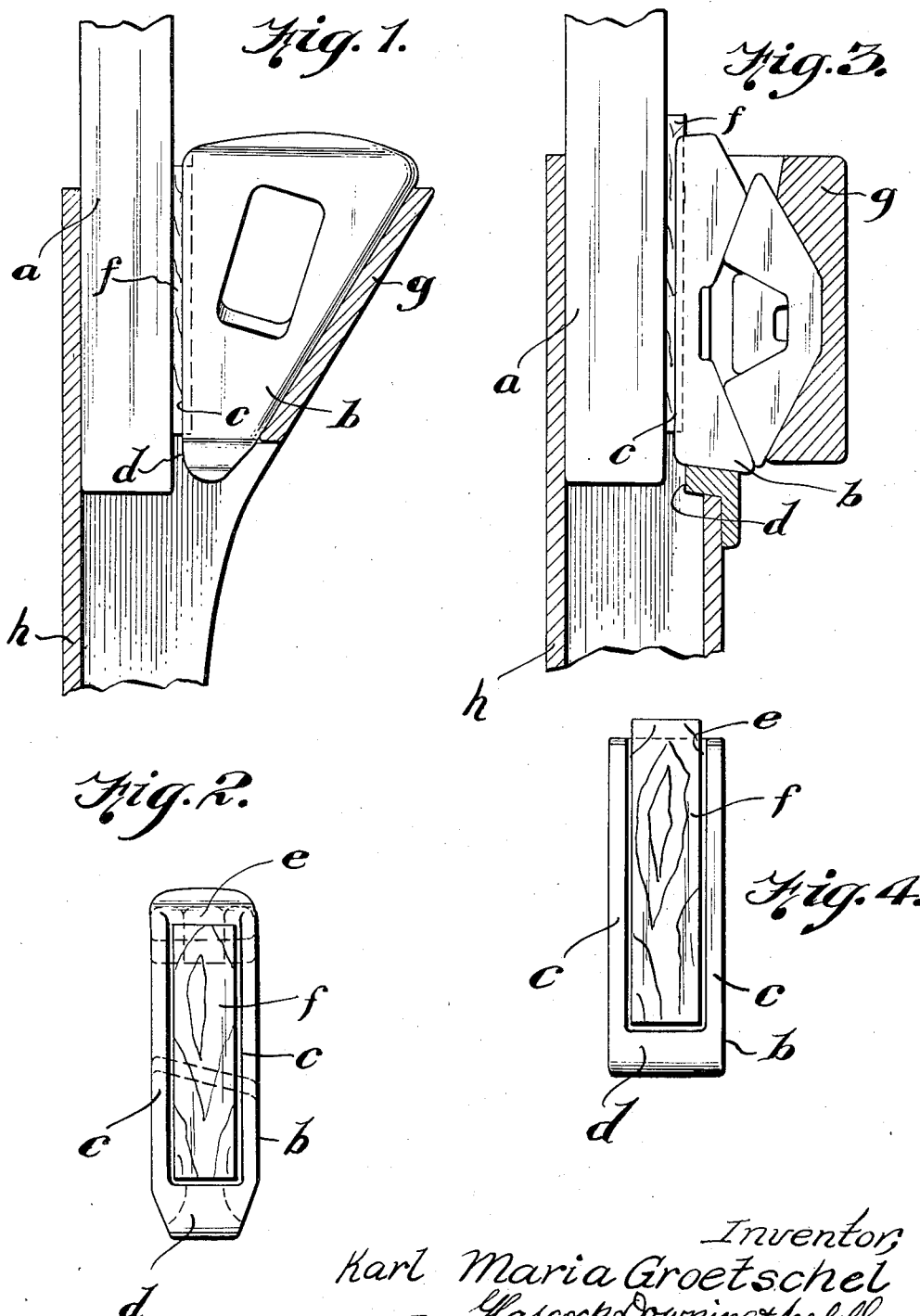

2,297,469

UNITED STATES PATENT OFFICE 2,297,469

CLAMPING MEMBER FOR TWO-PART IRON MINE STANCHIONS

Karl Maria Groetschel, Bochum, Germany; vested in the Alien Property Custodian

Application January 10, 1941, Serial No. 374,018
In Germany October 24, 1938

1 Claim. (Cl. 248—354)

This invention relates to the clamping member of the lock of two-part iron mine stanchions which bear against the wedgy inner stemple. This member is usually a wedge, a plate or a similar metal body. A compressible member is usually interposed in flexible stemples and in connection with rigid or so-called semi-rigid stemples, the clamping member is adapted to bear directly against the inner stemple.

In view of the varying conditions below ground, it is desirable to use one and the same stemple as a rigid stemple and also as a flexible stemple. This was hitherto not possible without inconvenience. In order to be able to use a flexible stemple, which operates with an additional compressible member bearing against the inner stemple, as a rigid stemple, it was necessary to replace the additional compressible member by a non-compressible member. Moreover, it is inconvenient to keep different additional members in readiness at the narrow working places. If a rigid or semi-rigid stemple is to be made substantially flexible by interposing an additional compressible member between the inner stemple and the said clamping member, there is usually not sufficient space in the lock pocket and suitable means are not available for preventing a displacement of the additional member. Both cases require improvement.

The present invention has for its object to solve this problem by transforming the clamping member of the lock which bears against the inner stemple. It is proposed to provide on that side of the clamping member, which is turned toward the inner stemple, a recess for receiving a braking or squeezing element but not in the known manner since the projecting limiting or bounding ledges of said recess have only for their object to prevent a displacement of the additional member. The limiting or bounding ledges have an adequate working surface and are arranged in such a manner that the stemple can also be used without the additional member and without being detrimental to the inner stemple or other parts thereof, more particularly the clamping member. It is proposed to make the recess in the shape or form of a groove closed by a transverse ledge below and by a longitudinal ledge on each side. The longitudinal groove offers the most favorable dividing possibility of the surfaces while avoiding too many transverse edges which are adapted to affect the inner stemple during the operation of the stemple. The said groove has also the advantage that the additional member can be easily inserted from above and easily removed again.

Clamping members have already been proposed which are resilient per se or which have received a slight flexibility by the insertion of corresponding resilient members. Special resilient members are embedded in trough-shaped hollow members in such a manner that the side flanges of the trough constitute a limitation for the spring load as soon as the spring is compressed accordingly. The stemple is therefore rigid. However, according to this proposal, resilient member and wedge are arranged in such a manner that the contact on the stemple must always take place with the closed side, that is to say, there is a complete and uniform contact surface which is not subjected to any change while according to the present invention the open side of the recess provided on the clamping member is turned toward the inner stemple. Furthermore, the insert or lining to be embedded in the recess is adapted to be exchanged and may also be dispensed with. The insert or lining may consist of various materials and may be selected as regards its braking value and its flexibility. It is obvious that the flexibility or rigidity of the stemple may be varied by means of the exchangeable insert or lining merely by exchanging the insert or lining.

According to the known stemple structures, the insert or lining is in the form of a wooden board, which serves only for obtaining the flexibility. The ledges, usually transverse ledges, arranged on the wedge were provided only for holding said wooden boards. As compared therewith, the efficiency according to the present invention is greater. The stemple is adapted to operate as a flexible stemple with insert or lining and as a so-called rigid stemple with and without insert or lining. Although the effective working surface of the wedge is diminished on the inner stemple, yet a one-sided damaging or seizing can be prevented by selecting suitable dimensions on the one hand, and by selecting the contacting surfaces as regards the material on the other hand. With regard to the working surface remaining in each case, it is proposed to give the surface or area of the recess and the entire surface or area of the ledges equal dimensions.

With reference to the clamping member according to the present invention, it is possible to use the stemple on the one hand as rigid support in that it is used without the braking or squeezing element and on the other hand, as a flexible support regulable within wide limits in that according to the conditions, a more or less wide, longer or thicker, softer or harder squeezer element is inserted in the recess. There is also the advantage, in the case of a flexible stemple, that a varying functional play between the additional member and its ledges can be produced and utilized. The action of the stemple may now be regulated and used without damaging the clamping member or inner stemple in that owing to the compressibility of the additional member, it yields to a certain extent and thereupon becomes substantially rigid while after the compression of the additional member, the surfaces of the rigid embracing ledges also come into contact or engagement with the inner stemple.

With reference to the accompanying drawing, two constructional examples of the present invention are shown therein.

Fig. 1 is a side elevation of the wedge pocket of a stemple with a single wedge as clamping member, and Fig. 2 is a front elevation of the wedge designed according to the present invention, and Figs. 3 and 4 show similar views of a constructional form in which there is provided between the inner stemple and the wedge members producing the pressure a movable intermediate member as clamping member which in this case takes up or receives the braking and squeezing element.

According to the structure shown in Figs. 1 and 2, there is arranged in the pocket $g$ of the outer stemple $h$, the clamping wedge $b$ provided with the recess $e$. The width of the recess $e$ is such that ledges $c$ are formed on both sides in a longitudinal direction. The recess $e$ is shut off or closed below by the transverse ledge $d$ which simultaneously forms the abutment for the compressible element $f$ inserted in the recess $e$. The entire surface or area of the ledges must be of such dimensions that it is sufficient for transmitting the stresses to the inner stemple.

In the constructional form according to Figs. 3 and 4, the double-wedge clamping member $b$ is the support of the recess $e$. The pocket $g$ on the outer stemple $h$ is adapted to the shape or form of the wedge gear and does not constitute the subject matter of the invention.

Having thus fully described the invention what is claimed as new and desired to be secured by Letters Patent is:

A two-part metallic mine stanchion including a lower stemple, an upper stemple slidably mounted in said lower stemple, means for clamping said upper stemple in said lower stemple, said clamping means including at least one wedge member having the inner face positioned to cooperate with the adjacent face of said upper stemple, and also having a vertical recess therein leaving a lower and side ledges, a compressible insert removably engaged in the recess and normally projecting beyond the inner face of the wedge member so as to contact the adjacent face of the stemple, the lower and side ledges having a surface area sufficient for independent transmission of the clamping forces acting on the inner stemple when the insert is removed and the insert being variable in thickness and material so that its degree of clamping action may thereby be regulated.

KARL MARIA GROETSCHEL.